United States Patent
Reinartz et al.

[11] Patent Number: 5,653,249
[45] Date of Patent: Aug. 5, 1997

[54] METHOD FOR CLOSING CHANNELS CONTAINING PRESSURE FLUID IN A HOUSING

[75] Inventors: Hans-Dieter Reinartz, Frankfurt; Peter Volz, Darmstadt; Dalibor Zaviska, Eschborn/Ts; Helmut Weisbrod, Bad-Nauheim, all of Germany

[73] Assignee: ITT Automotive Europe GmbH, Germany

[21] Appl. No.: 507,498

[22] PCT Filed: Feb. 8, 1994

[86] PCT No.: PCT/EP94/00357

§ 371 Date: Oct. 11, 1995

§ 102(e) Date: Oct. 11, 1995

[87] PCT Pub. No.: WO94/19128

PCT Pub. Date: Sep. 1, 1994

[30] Foreign Application Priority Data

Feb. 27, 1993 [DE] Germany ............ 43 06 220.2

[51] Int. Cl.$^6$ .................. F16K 31/06; B21K 1/24
[52] U.S. Cl. ............... 137/1; 251/129.15; 29/890.13
[58] Field of Search ............. 251/129.15, 129.01; 137/1, 454.2, 454.5, 454.6; 29/890.13, 890.124

[56] References Cited

U.S. PATENT DOCUMENTS 5,333,836  8/1994  Fukuyo et al. ............. 251/129.15

FOREIGN PATENT DOCUMENTS

| 2805409 | 2/1978 | Germany . |
| 3141259 | 10/1981 | Germany . |
| 3145469 | 11/1981 | Germany . |
| 3736539 | 10/1987 | Germany . |
| 3943183 | 4/1989 | Germany . |
| 4221988 | 4/1992 | Germany . |
| 2038682 | 7/1980 | United Kingdom . |
| 2198589 | 6/1988 | United Kingdom . |
| WO9401708 | 2/1993 | WIPO . |

OTHER PUBLICATIONS

Search of the German Patent Office for Application P4306220.2.

*Primary Examiner*—Kevin Lee
*Attorney, Agent, or Firm*—J. Gordon Lewis; Thomas N. Twomey

[57] ABSTRACT

A method for closing channels containing pressure fluid in a housing, so that the dynamic load applied to the housing and the closing member during the pressing process is minimized. Thus a pressing force with a defined direction and entity acts discontinuously on the closing member, the latter realizes a discontinuous feed motion directed into the channel, acting only on the housing material at the recess of the closing member producing the form-lock to yield into the recess due to the discontinuous force impact on the closing member.

13 Claims, 2 Drawing Sheets

METHOD FOR CLOSING CHANNELS CONTAINING PRESSURE FLUID IN A HOUSING

TECHNICAL FIELD

The present invention relates to a method for closing channels containing pressure fluid in a housing.

BACKGROUND OF THE INVENTION

German application P 42 21 988.4 discloses a closing member including an electromagnetically controlled valve, which is designed as valve accommodating member (cartridge) and is pressed into the channel system of a valve chamber block containing pressure fluid and provided with stepped bores. It is possible that the material in the area of the stepped bore is not only displaced mechanically into the groove-shaped recess on the valve accommodating member, but at the same time can also cause an undesired deformation of areas adjacent to the valve chamber block which may also be weakened by bores, thus affecting the dimensional accuracy of these areas sensitive to stability.

The objective of the present invention is to provide a method for closing channels containing pressure fluid in a housing which during the pressing-in process causes minimal dynamic stress of the housing, and which ensures that the plastic deformation grade is limited to the area of the housing which is necessary for the form-lock.

This objective is achieved by operating a closing member, by means of a pressing force with a defined direction and entity acting discontinuously on the closing member, such that it carries out a discontinuous feed motion directed into the channel, with the result that only the housing material (causing the plastic form-lock with the recess of the closing member) yields into that recess due to the discontinuous dynamic effect at the closing member.

DETAILED DESCRIPTION OF THE PREFERRED EMBODIMENT

Figure 1:
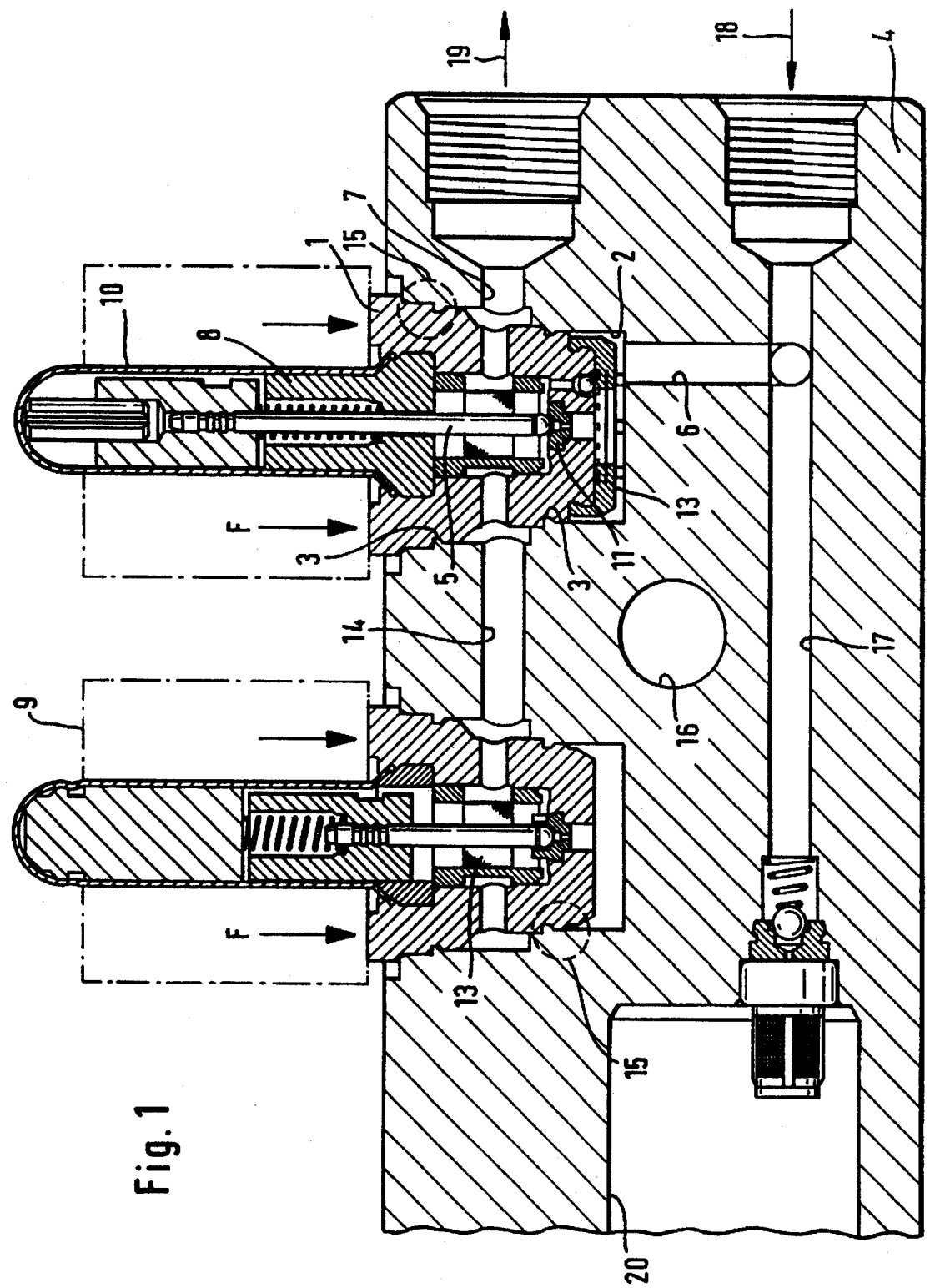
FIG. 1 shows a cross-section through a housing for the accommodation of several members which close the pressure fluid channels.

FIG. 1 shows an example of how to use the fastening method of the present invention for several electromagnetic valves within a block-shaped housing 4, presenting at the same time a pump, a damping element as well as pressure fluid connections to a pressure fluid supply means and pressure fluid consumers. The closing member 1 is an essentially sleeve-shaped part of only few millimeters, consisting preferably of a cold-drawn material which is harder than that of housing 4. Housing 4, preferably made of aluminum alloy, consequently is less harder than the closing members 1 which are, for example, made of machining steel. This difference in hardness is finally decisive for the essentially positive fastening of the closing member 1 in housing 4. A convenient measure with regard to construction are the recesses on each closing member 1, formed as circumferential ring grooves and arranged approximately similar to grooves on the surface of closing member 1, which is graded with regard to the diameter.

Thus, during the pressing-in process the relatively soft material of housing 4 can yield into the groove 3 as a circumferential projection, due to its plastic deformation, and then be compressed. Since the diameter of closing member 1 diminishes with regard to the Joining direction, each closing member 1 therefore assumes the function of a caulking stamp in the steps to which the diameter of each stepped bore 2 of housing 4 is adapted. The original depth of the respective bore step in housing 4 is smaller than the necessary caulking stroke of the caulking stamp of the closing member 1 by the amount of the volume to be displaced in the Joining direction into the recesses 3. In FIG. 1 it can be seen that each sleeve-shaped closing member 1 accommodates the channels 6, 7 which can be closed by a valve tappet 5, the magnet core 8, the magnet coil 9, the valve sleeve 10, the valve seat 11 and a filter 13.

In order to ensure a safe sealing of the closing member 1 in housing 4, the through-bore 14 for the pressure fluid, formed as a transverse channel, has to be provided with a circumferential caulking point above and below the channel so that, on the one hand, when the valve tappet 5 is closed, a short circuit current and thus a pressure compensation between the two channels 6,7 of housing 4 is prevented, and on the other hand, when the valve tappet 5 is open, the fluid being under high pressure cannot penetrate in the direction of the upper caulking point 15 towards the surface of the housing 4.

The caulking points 15 consequently do not only generate the retention force for the fastening of the magnetic valve, but ensure also at the same time the sealing of closing member 1 in housing 4, which is hydraulically acted upon.

According to FIG. 1, below the through-bore for the pressure fluid 14, which connects the two magnetic valves, is shown a bore 16, running in transverse direction, which accommodates the pump so that the pump bore extends perpendicularly between the two axes of the magnetic valves. Furthermore, in FIG. 1, channel 17 located below the pump bore, connects, for example, a pressure fluid supply means 18 designed as brake pressure transducer for slip-controlled automotive brake systems by means of the magnetic valve, the basic position of which is open in the absence of current, with the pressure fluid consumer 19 which, for example, acts as wheel brake of an automotive vehicle, the pump bore presenting, in the branch leading to this pressure fluid channel, a hydraulic connection to the pump-silencing chamber 20 not shown in FIG. 1, which is also in connection with channel 17.

In addition to the explanations made at the beginning reference is made to another possibility of arranging a separate, i.e. additional engagement resp. caulking of closing member 1 with a tool at the surface of the housing.

Figure 2:
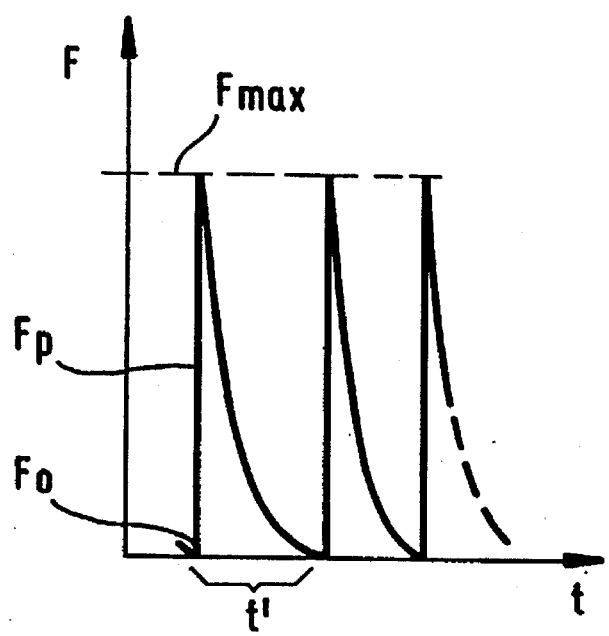
FIG. 2 shows a first dynamic load diagram.
Figure 3:
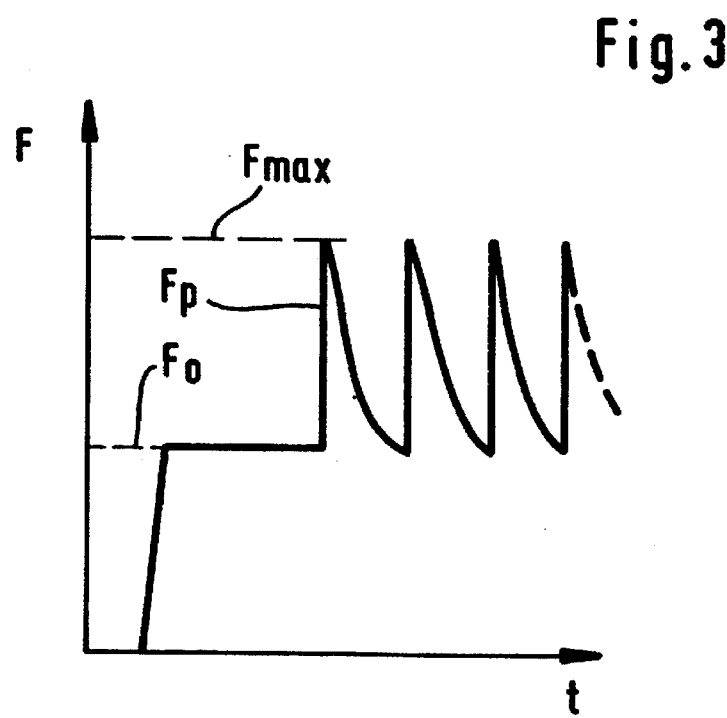
FIG. 3 shows a second dynamic load diagram.

In order to guarantee the dimensional accuracy of the original housing structure when pressing each closing member 1 into the stepped bore 2, a variable pressing force Fp is applied to the outer front surfaces of closing member 1, which is shown in the following on the basis of two diagrams (FIGS. 2, 3). Preferably, the pressing force Fp is applied to the outer front surfaces of closing member 1 in a circular circumferential manner, resulting in the closing member 1 realizing a wobbling feed motion directed into the stepped bore 2.

FIG. 2 shows a force-time diagram for a dynamic cyclical load applied to closing member 1 according to which the force amplitude of the pressing force Fp increases, within a first short time interval t', with an abrupt rise in a linear manner along the abscissa from a minimum value Fo to the admissible maximum value Fmax of the ordinate and then again falls to the original value Fo by means of a damped dying process. This dynamic load application is repeated in a cyclical sequence until, on reaching the admissible plastic final deformation of stepped bore 2 in housing 4, the friction and form resistance reaches a defined limit value being above the maximum value Fmax of the cyclically applied pressing force Fp avoiding thus a further feed motion of the closing member 1 into the stepped bore 2 at a constant force impulse Fp by means of the friction and form resistance.

FIG. 3 shows an alternative force-time diagram for a dynamic cyclically increasing load application on the closing member 1, according to which the force amplitude of Fp increases linearly, within a first time interval, until it reaches a constant permanent preloading force Fo, is then retained and subsequently applied periodically between the preloading force minimum Fo and the maximum value Fmax. Thus the course of the increase rate varies periodically between the basic preloading force Fo of closing member 1 and the maximum value Fmax of the force amplitude. For example, the course of the increase rate of the force impulse Fp could vary periodically between the preloading force Fo and the maximum value Fmax according to a sine function.

By means of the present invention the process of deforming the area of the housing which causes the form-lock can be limited to the stepped bore with relatively small force impulses applied in intervals having a small intensity, without affecting the dimensional stability or the structure of constructively weak border areas. In addition to the characteristics of the present invention already illustrated above, can be deducted further embodiments which will not be explained in detail, though, because they are parts of the present invention.

We claim:

1. Method for closing housing channels containing pressure fluid by means of a closing member to be pressed into the channel, said closing member having an outer perimeter of which is arranged at least one recess in which the material of the housing is caused to yield, when the closing member is pressed into the channel, in order to achieve a form-lock, the channel being formed as a stepped bore, the bore section of which being oriented towards the outside of the housing and having a bigger diameter, by means of a shoulder passes into an inner bore section with smaller diameter, oriented towards a delivery side of the pressure fluid, said closing member provided with a piston section corresponding to the bore, said piston section having a different diameter, between which is formed the recess undercut and in which the housing material is pressed by plastic deformation thus achieving a form lock, comprising the steps of:

exerting a pressing force such that it acts discontinuously on the closing member thereby causing said closing member to carry out a discontinuous feed motion oriented into the channel and that only the housing material leading to the plastic form-lock at the recess of the closing member is caused to yield into the recess due to the discontinuous force acting on the closing member.

2. Procedure as claimed in claim 1, wherein the pressing force is formed by a short-time cyclical sequence of constant force impulses, the amplitude rising abruptly and in a linear manner at the beginning of the force impulse until it reaches the maximum value, and in that the amplitude, after passing the impulse maximum, by means of a damped dying process returns to an original value which is smaller with regard to the maximum value.

3. Procedure as claimed in claim 1, wherein the pressing force is formed of a force amplitude which, beginning from a preloading force permanently acting upon the closing member, is increased up to a force impulse which causes the feed motion of the closing member, a damped dying process of the force impulse being introduced after having reached the maximum value of the force impulse.

4. Procedure as claimed in claim 3, wherein the force minimum of the force impulse corresponds to the preloading force.

5. Procedure as claimed in claim 3, wherein the force impulse varies periodically between the preloading force and the maximum value.

6. Procedure as claimed in claim 3, wherein the force impulse varies periodically between the preloading force and the maximum value according to a sine function.

7. Procedure as claimed in claim 1, wherein the pressing force acting on the closing member along its outer border is applied in a circular circumferential manner, resulting in the closing member realizing a wobbling feed motion directed into the channel.

8. Method for closing housing channels containing pressure fluid by means of a closing member to be pressed into the channel, said closing member having an outer perimeter of which is arranged at least one recess in which the material of the housing is caused to yield, when the closing member is pressed into the channel, in order to achieve a form-lock, the channel being formed as a stepped bore, the bore section of which being oriented towards the outside of the housing and having a bigger diameter, by means of a shoulder passes into an inner bore section with smaller diameter, oriented towards a delivery side of the pressure fluid, said closing member provided with a piston section corresponding to the bore, said piston section having a different diameter, between which is formed the recess undercut and in which the housing material is pressed by plastic deformation thus achieving a form lock, comprising the steps of:

exerting a pressing force such that it acts discontinuously on the closing member thereby causing said closing member to carry out a discontinuous feed motion oriented into the channel and that only the housing material leading to the plastic form-lock at the recess of the closing member is caused to yield into the recess due to the discontinuous force acting on the closing member;

wherein the pressing force is formed by a short-time cyclical sequence of constant force impulses, the amplitude rising abruptly and in a linear manner at the beginning of the force impulse until it reaches the maximum value, and in that the amplitude, after passing the impulse maximum, by means of a damped dying process returns to an original value which is smaller with regard to the maximum value.

9. Procedure as claimed in claim 8, wherein the pressing force is formed of a force amplitude which, beginning from a preloading force permanently acting upon the closing member, is increased up to a force impulse which causes the feed motion of the closing member, the damped dying process of the force impulse being introduced after having reached the maximum value of the force impulse.

10. Procedure as claimed in claim 9, wherein the force minimum of the force impulse corresponds to the preloading force.

11. Procedure as claimed in claim 9, wherein the force impulse varies periodically between the preloading force and the maximum value.

12. Procedure as claimed in claim 9, wherein the force impulse varies periodically between the preloading force and the maximum value according to a sine function.

13. Procedure as claimed in claim 8, wherein the pressing force acting on the closing member along its outer border is applied in a circular circumferential manner, resulting in the closing member realizing a wobbling feed motion directed into the channel.

* * * * *